United States Patent
Gommans

(10) Patent No.: US 10,677,418 B2
(45) Date of Patent: Jun. 9, 2020

(54) LED MODULE WITH OUTLET LENS

(71) Applicant: SIGNIFY HOLDING B.V., Eindhoven (NL)

(72) Inventor: Hendrikus Hubertus Petrus Gommans, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/760,237

(22) PCT Filed: Sep. 20, 2016

(86) PCT No.: PCT/EP2016/072320
§ 371 (c)(1),
(2) Date: Mar. 15, 2018

(87) PCT Pub. No.: WO2017/055141
PCT Pub. Date: Apr. 6, 2017

(65) Prior Publication Data
US 2018/0259153 A1  Sep. 13, 2018

(30) Foreign Application Priority Data

Sep. 29, 2015 (EP) .................................. 15187257

(51) Int. Cl.
*F21V 5/04* (2006.01)
*G02B 19/00* (2006.01)
*G02B 3/08* (2006.01)
*G02B 27/09* (2006.01)

(52) U.S. Cl.
CPC ................ *F21V 5/045* (2013.01); *F21V 5/04* (2013.01); *G02B 3/08* (2013.01); *G02B 19/0014* (2013.01); *G02B 19/0061* (2013.01); *G02B 27/095* (2013.01)

(58) Field of Classification Search
CPC ... F21V 5/045; F21V 5/04; F21V 5/00; F21V 5/048; F21V 5/08; G02B 3/08; G02B 19/0014; G02B 19/0061; G02B 27/095; G02B 19/0009; G02B 19/0004
USPC ..................................................... 362/311.02
See application file for complete search history.

(56) References Cited

U.S. PATENT DOCUMENTS

| 7,766,530 | B2 | 8/2010 | Hwang et al. |
| 8,405,920 | B2 | 3/2013 | Premysler |
| 8,500,300 | B2 | 8/2013 | Fang et al. |
| 2005/0286145 | A1 | 12/2005 | Silhengst et al. |

(Continued)

FOREIGN PATENT DOCUMENTS

WO  2010119580 A1  10/2010

*Primary Examiner* — Bao Q Truong
*Assistant Examiner* — Jessica M Apenteng
(74) *Attorney, Agent, or Firm* — Daniel J. Piotrowski

(57) ABSTRACT

A lighting module comprises an LED and a lens over the LED. The lens has a beam shaping surface and a pass through surface with a stepped profile. The steps of the stepped profile each comprise a riser portion and an output portion, wherein the riser portions are parallel with the ray direction passing through the surface at that location and the output portions are normal to the ray direction passing through the surface at that location. The pass through surface for example performs no beam shaping function. The stepped profile enables the thickness of the lens to be reduced to reduce the amount of material needed.

12 Claims, 10 Drawing Sheets

(56) References Cited

U.S. PATENT DOCUMENTS

| | | |
|---|---|---|
| 2007/0091615 A1 | 4/2007 | Hsieh |
| 2010/0165637 A1 | 7/2010 | Premysler |
| 2012/0014115 A1* | 1/2012 | Park .................. G02B 27/0955 |
| | | 362/311.02 |
| 2012/0087106 A1* | 4/2012 | Fancsali ................ H01L 33/507 |
| | | 362/84 |
| 2012/0268950 A1 | 10/2012 | Parkyn |
| 2014/0168994 A1* | 6/2014 | Wang He .................. F21V 5/04 |
| | | 362/311.02 |

* cited by examiner

LED MODULE WITH OUTLET LENS

CROSS-REFERENCE TO PRIOR APPLICATIONS

This application is the U.S. National Phase application under 35 U.S.C. § 371 of International Application No. PCT/EP2016/072320, filed on Sep. 20, 2016 which claims the benefit of European Patent Application No. 15187257.9 filed on Sep. 29, 2015. These applications are hereby incorporated by reference herein.

FIELD OF THE INVENTION

This invention relates to an LED module with an output lens for shaping the light output.

BACKGROUND OF THE INVENTION

The invention relates for example to an LED module which is designed to provide uniform illumination of a planar surface. However, the invention can be applied generally to beam shaping optics.

One known approach to achieve a planar surface illumination is to use a so-called batwing intensity distribution (also referred to as a wide beam intensity distribution). The term batwing refers to a highly peaked shape of the intensity distribution in a polar plot.

FIG. 1 shows an example of a batwing intensity distribution as a polar plot. The two wings 10, 12 in this example have a peak intensity at 60 degrees each side of the normal, and the aim is to provide a uniform surface illumination over the full 120 degree range. The intensity is higher at the grazing angles because the surface area being illuminated per unit angle increase steeply.

The ring 14 is the light intensity in a perpendicular direction. For a rotationally symmetric light distribution this would be a batwing distribution as well. For a linear light source it is for example a circle (i.e. Lambertian), distribution.

To create the desired batwing profile from an LED, an optical component is required to compensate the well-known cosine fourth law which applies to a Lambertian point source (by which illuminance falls following a $\cos^4 \vartheta$ function). The optical design thus needs to change the Lambertian intensity distribution from an LED output intensity into the batwing distribution.

The batwing light distribution allows for a uniform illumination of a planar surface for example even up to a 140° beam angle. Such light distributions and hence lens designs are used for example in street lighting and wall washer applications. In these examples, the batwing distribution targets a planar surface in the far field: the illuminated surface is positioned at a distance much larger than the light module dimensions.

Similar batwing distributions may also be applied to illuminate the interior of a luminaire housing, e.g. the exit window of a luminaire. This would then create a spatially uniform luminescent panel. This gives a desired uniform appearance of the luminaire itself rather than an illuminated surface. A known alternative approach for increasing spatial uniformity in a luminescent panel is by extensive scattering: using reflective matte white surfaces at the inner side of the casing or well-designed white paint dot patterns on a light guide.

Scattering based solutions typically allow for a high spatial uniformity at the expense of efficiency and/or form factor. Moreover, the light distribution at the exit window will be limited to a Lambertian distribution at each position of the surface, while an optical element with a batwing design may instead assign a constant flux to each position from a known direction, i.e. the light source position. This allows for further beam shaping at the exit window position.

There are two known designs of lens capable of changing a Lambertian intensity distribution into a batwing intensity distribution.

A first example is a so-called peanut design as shown in FIG. 2 and a second example is a so-called bubble optic as shown in FIG. 3.

The difference in shape is determined by the choice of ray deflecting surface. The surface changing the Lambertian distribution into a batwing is for the peanut optic the outer lens surface while for the bubble optic it is the inner surface.

Mass manufacturing technology for such lenses is for example based on printing or injection moulding, where the cost price of a single optic is primarily determined by the amount of plastic and its cycle time. Also, the cycle time scales with the amount of plastic. Hence, in order to provide cost effective solutions, a design is desired that uses the least amount of material.

There is thus a need for a lens design for an LED design which enables a reduction in the amount of material needed.

SUMMARY OF THE INVENTION

The invention is defined by the claims.

According to an example, there is provided a lighting module comprising:

an LED having a light output area; and a refractive lens over the LED for providing beam shaping of the light output of the LED, wherein the lens comprises an inner surface and an outer surface, wherein one of the the inner and outer surfaces is a smooth, beam shaping surface which provides a beam shaping function essentially only via refraction, and the other of the inner and outer surfaces has a stepped profile, wherein the steps of the stepped profile each comprise a riser portion and an output portion, wherein the riser portions are parallel with a ray direction originating from a central point of the light output area of the LED and the output portions are normal to said ray direction.

In this design, the one surface functions acts as a pass through surface, performing no or substantially no beam shaping function. The expression "substantially" in this respect means that the beam shaping function via refraction is insignificant for the desired functioning of the lighting module, which means a change in direction of the light ray via refraction at the output portion of, for example, at the most 1.5°, i.e. an incident angle ß of, for example, at the most 2.5° (wherein the surface normal to the output portion is at an incident angle of 0°). Note that a true pass through mode will in practice only apply if the LED is assumed to be a point source (hence the definition of a point output above), and the finite size of an actual LED means there will be some rays which refract at the pass through surface. However, the optical function of that surface is essentially minimized to provide no beam shaping for rays originating from a point source which is an approximation of the LED source. Thereto the LED is a single LED or a compactly arranged cluster of a few LEDs, i.e. for example four LEDs, but at the most, nine LEDs, having a total light output area of a few tenths to a few mm², for example 0.5 to 10 mm², facing the output portion. Smooth in this respect means being free from roughness, bumps, ridges or irregularities (larger than sub-micron scale) and not broken up into teeth.

The use of a stepped surface means the thickness of the lens, namely between the inner and outer surfaces, may be reduced. The thickness may be made to be substantially constant overall when ignoring the variations in thickness due to the steps.

The LED for example generates an output with a Lambertian intensity distribution, which is to be converted by the lens element. This means a standard LED package can be used without any other beam shaping optics. The output intensity of the module for example then has a batwing distribution. This is of particular interest for generating a uniform illumination over a planar surface.

In the lighting module it is possible that for rays that are emitted in a first angle range of at least 5° to 40° with the optical axis, the rays are refracted away from said optical axis, while rays that are emitted in a second angle range of at least 75° to 85° with the optical axis are refracted away towards the optical axis. To further tune the batwing profile, the refraction away from the optical axis can be present for rays in a first angle range of at least 0.1° to 50°, and respectively for refraction towards the optical axis can be present in a second angle range of at least 65° to 89.9°. The beam shaping surface is for example shaped such that rays emitted along the optical axis are refracted away from the optical axis, for example by at least 5 degrees, and rays approaching 90° to the optical axis are refracted towards the optical axis, for example by at least 5 degrees. By this optical function a batwing profile can be generated. For detailed fine tuning of the batwing profile it is, for example, possible that for rays emitted by the LED in a first angle range of 0 degrees to 45 degrees with the optical axis, the refraction angle is away from the optical axis and gradually increases from 5° refraction for rays at about 0 degrees to maximally about 10°, or 18° or even 25° refraction for rays at about 25 to 35 degrees with the optical axis, to then decrease to about 0° refraction for rays at about 60 degrees with the optical axis; and further for rays emitted by the LED in a second angle range of about 60 degrees to 90 degrees with the optical axis the refraction angle is towards the optical axis and gradually increases from 0° refraction for rays at about 60 degrees to maximally about 20°, or 30° or even 35° refraction for rays at 90 degrees with the optical axis.

In one set of examples, the inner surface is the beam shaping surface, the outer surface is the pass through surface. The outer surface is then brought in towards the inner surface by making use of the step profile. This means the inner surface can be designed by conventional approaches, since the outer surface then performs no additional optical function. The lens may then comprise a bubble lens, i.e. a lens wherein the maximum thickness between the inner and outer surfaces over the whole area of the inner and outer surfaces is less than 0.1 times the minimum cross-sectional diameter of the lens. Typically in a bubble lens a relatively high reduction in the amount of material is enabled.

In another set of examples, the outer surface is the beam shaping surface, the inner surface is the pass through surface. The inner surface is then brought out towards the outer surface by making use of the step profile. This means the outer surface can be designed by conventional approaches, since the inner surface then performs no additional optical function. The lens may then comprise a peanut lens.

The minimum thickness between the inner and outer surfaces may be less than 1 mm. This enables the amount of material needed to be reduced significantly.

The minimum thickness may be less than 0.8 mm and or even less than 0.6 mm. The minimum thickness that is chosen will for example depend on the mechanical properties of the material used, and the required strength and rigidity, as well as the ease of manufacture. Thus, there will be a trade-off between the minimum thickness (which gives a reduction in material needed) and the manufacturability.

The maximum thickness between the inner and outer surfaces over the whole area of the inner and outer surfaces may be less than three times the minimum thickness. This means a relatively constant thickness is provided, which is sufficient for the rigidity of the lens but allows a reduction in material needed.

The maximum thickness between the inner and outer surfaces over the whole area of the inner and outer surfaces may be less than double the minimum thickness. It may be a substantially constant thickness when ignoring thickness variations relating to the step profile, i.e. if averaging out the steps.

As the thickness variations are reduced, so the volume of material needed is reduced.

The distance between the LED and the inner surface may be in the range 1 to 20 times the lateral extent of a light output surface of the LED.

The width of the outer surface of the lens at its base maybe in the range 0.5 to 3 times the lens height.

These dimensional choices provide options for finding a desired trade-off between the size of the lens and the optical performance. As the size is reduced, the LED size plays a greater role in diminishing the optical quality of the output.

The lens is for example formed of PC, PMMA, PET, PEN or COC. These enable the lens to be molded using conventional materials and equipment.

BRIEF DESCRIPTION OF THE FIGURES

Further areas of applicability of the present systems will become apparent from the detailed description provided hereinafter. It should be understood that the detailed description and specific examples, while indicating exemplary embodiments of the systems and methods, are intended for purposes of illustration only and are not intended to limit the scope of the invention. These and other features, aspects, and advantages of the apparatus, systems and methods of the present invention will become better understood from the following description, appended claims, and accompanying schematic drawing in which:

DETAILED DESCRIPTION OF THE EMBODIMENTS

The invention provides a lighting module comprising an LED and a lens over the LED. The lens has a beam shaping surface and a pass through surface with a stepped profile. The steps of the stepped profile each comprise a riser portion and an output portion, wherein the riser portions are parallel with the ray direction passing through the surface at that location and the output portions are normal to the ray direction passing through the surface at that location. The pass through surface for example performs no beam shaping function. The stepped profile enables the thickness of the lens to be reduced to reduce the amount of material needed.

FIG. 4 shows a known bubble lens design. FIG. 4(a) shows the shape of the lens in cross section. It has an inner surface 40 and an outer surface 42. The LED 44 is mounted in an air cavity beneath the inner surface. The lens is formed from a material of refractive suitable index such as polycarbonate (PC) or Poly(methyl methacrylate) (PMMA). Other possible materials are silicones, polyethylene terephthalate (PET), Polyethylene naphthalate (PEN), and cyclic olefin copolymer (COC).

The inner surface 40 performs the main lensing function and as shown, rays near the normal are bent away from the normal and lateral rays are bent towards the normal. This defines the batwing profile.

For this conventional bubble optic design, the outer surface 42 is located at sufficiently large distance such that it can be approximated by a hemisphere, and it performs some limited additional beam shaping.

Figure 1:
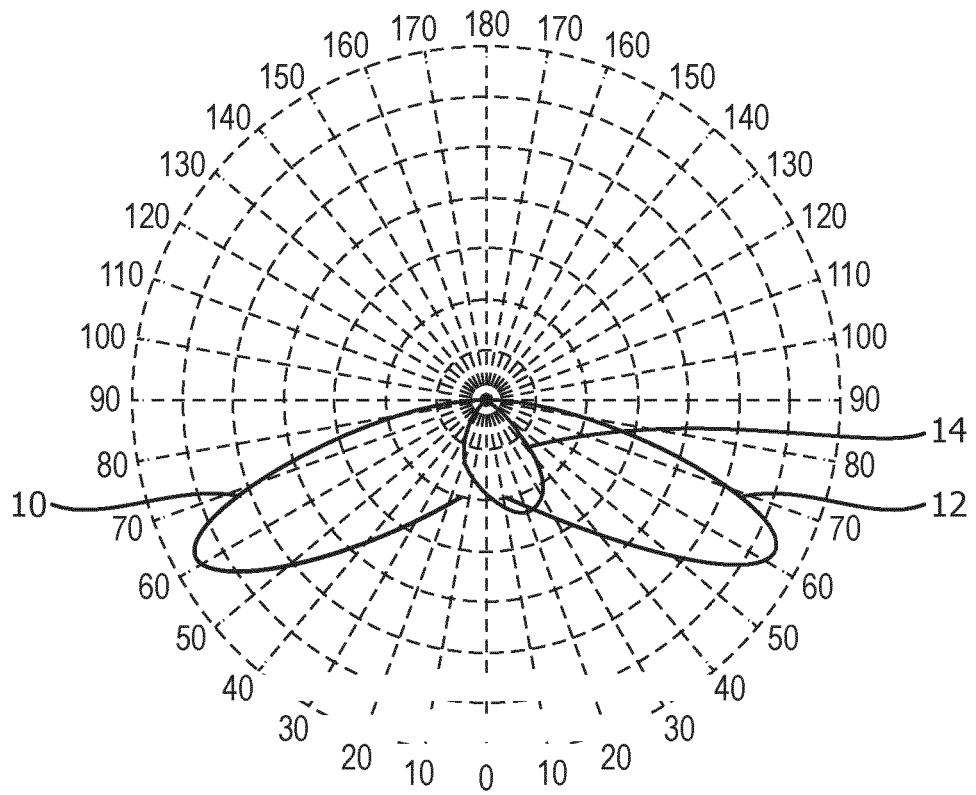
FIG. 1 shows a known batwing intensity distribution.
Figure 2:
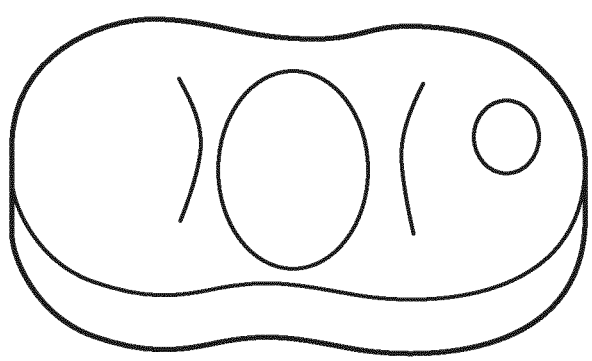
FIG. 2 shows in simplified form the shape of a peanut lens.
Figure 3:
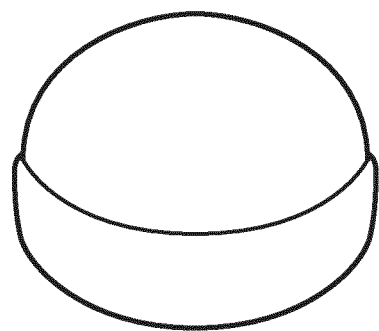
FIG. 3 shows in simplified form the shape of a bubble lens.
Figure 4A:
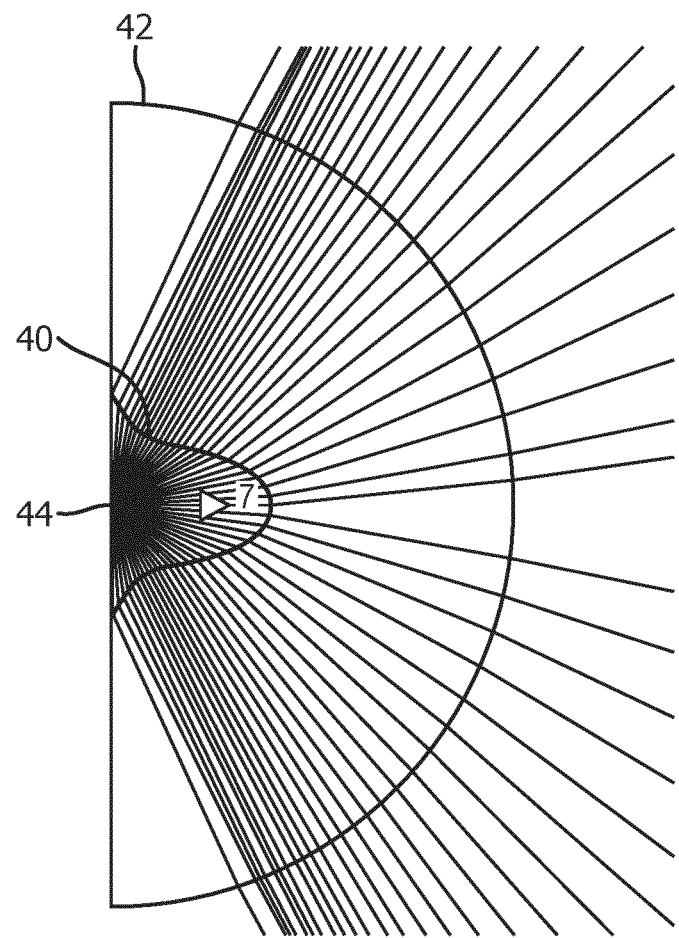
FIG. 4 shows the shape of the internal and external surfaces of a known bubble lens more clearly, and shows the ray paths through the lens, the intensity distribution at the output, and the intensity distribution when projected on a surface.
Figure 4B:
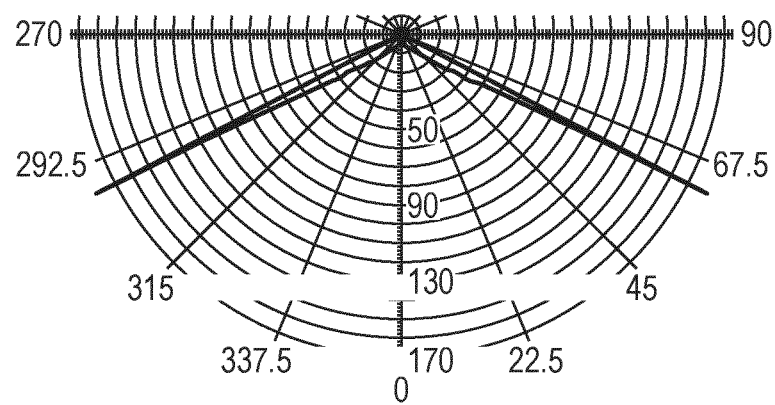

FIG. 4(b) shows the batwing intensity profile.

Figure 4C:
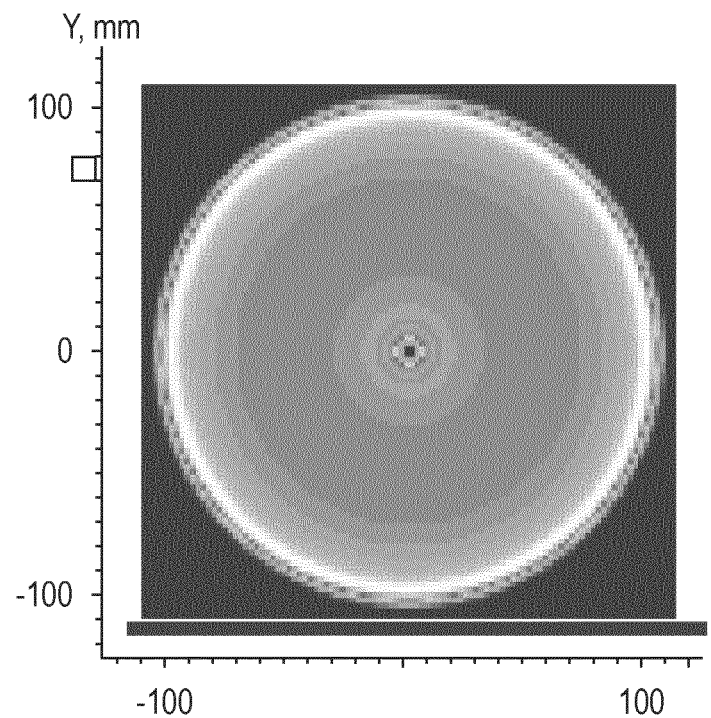

FIG. 4(c) shows the intensity distribution on a planar surface at a distance from the LED such that a circle of illumination is formed of radius 10.7 cm. For the analysis conducted, a 100 lm LED package was used, with a planar receiver positioned at 5 cm from the source and a far field receiver was used to calculate the intensity distribution. The optically active surface 40 is designed to uniformly illuminate the planar receiver at 5 cm distance up to a full angle of 130°: i.e. to generate a uniformly lit circular spot with radius of 10.7 cm (=5 cm×tan 65°). The uniform illuminance value would then yield 2770 lux (=100 lm divided by the spot area).

In practice, there is illumination over the full area, but there are bands of different intensity at different radius. This is shown by different shading in the image of FIG. 4(c). The light intensity distribution is represented in FIG. 4(d) which functions as a key for FIG. 4(c).

Figure 4D:
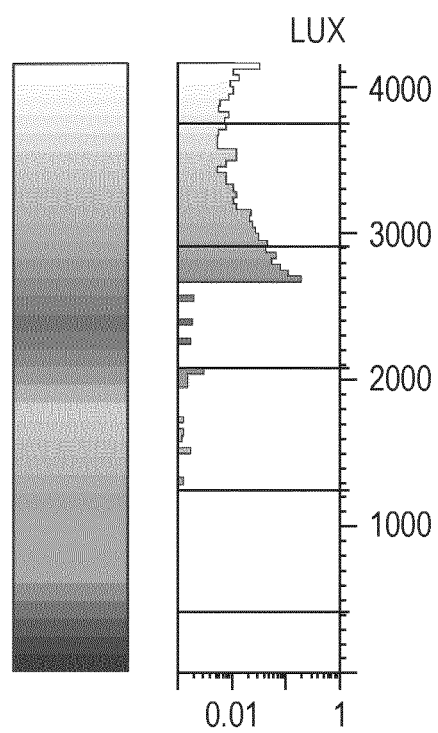

Each shading depth in FIG. 4(c) is plotted in FIG. 4(d) to the left, and the right side of FIG. 4(d) provides a measure for the number of pixels in the illuminated surface that have that particular intensity value. The x-axis is a count value and the y-axis is a luminance value. For example, for a perfectly uniformly illuminated area, there will be only one peak for one particular light intensity, and the count will be the full number of pixels.

As can be seen in FIG. 4(d) there is a range of intensity values, and two general peaks (at around 4000 lux and 2800 lux).

Using a first approach, the design of FIG. 4 is modified by bringing the optically less active surface (which in FIG. 4 is the outer surface 42, but may be the inner or the outer surface depending on the design) as close to the optical active surface 40 as possible.

FIG. 5 shows the shape of the internal and external surfaces of a first example of bubble lens based on the design of FIG. 4 and shows the same information as in FIG. 4.

In FIG. 5, the bubble optic has a hemispherical dome of reduced thickness. The thickness directly over the LED is reduced to 1 mm or less, for example 0.8 mm, 0.6 mm or even 0.5 mm.

The inner surface again provides the main optical functionality. As shown, the outer surface also performs some lensing function as well.

Simply reducing the size of the outer hemispherical surface in the manner shown in FIG. 5 yields an even more pronounced peaked light distribution at the outer diameter of the beam spot. The reduction in material needed thus comes at the expense of a deteriorated optical beam shaping function.

Figure 5A:
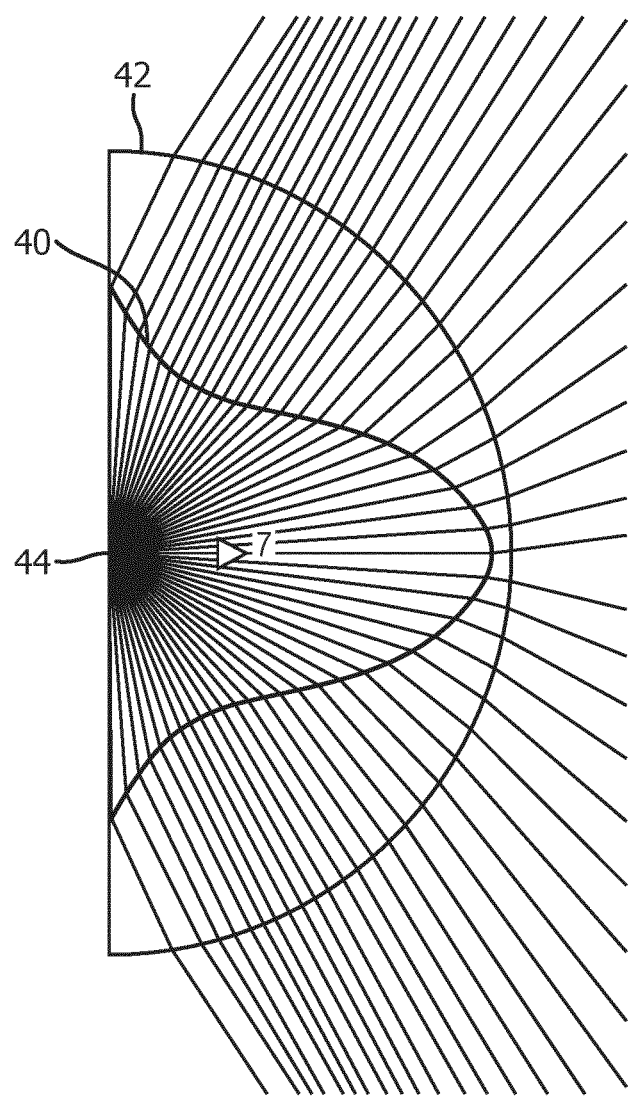
FIG. 5 shows the shape of the internal and external surfaces of a modified bubble lens, and shows the ray paths through the lens, the intensity distribution at the output, and the intensity distribution when projected on a surface.
Figure 5B:
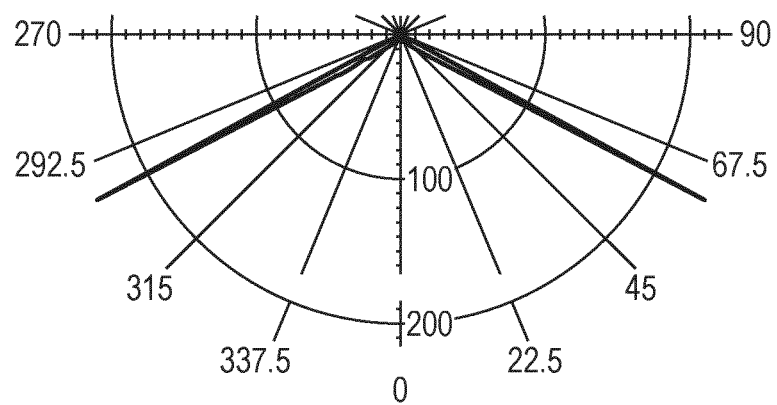
Figure 5C:
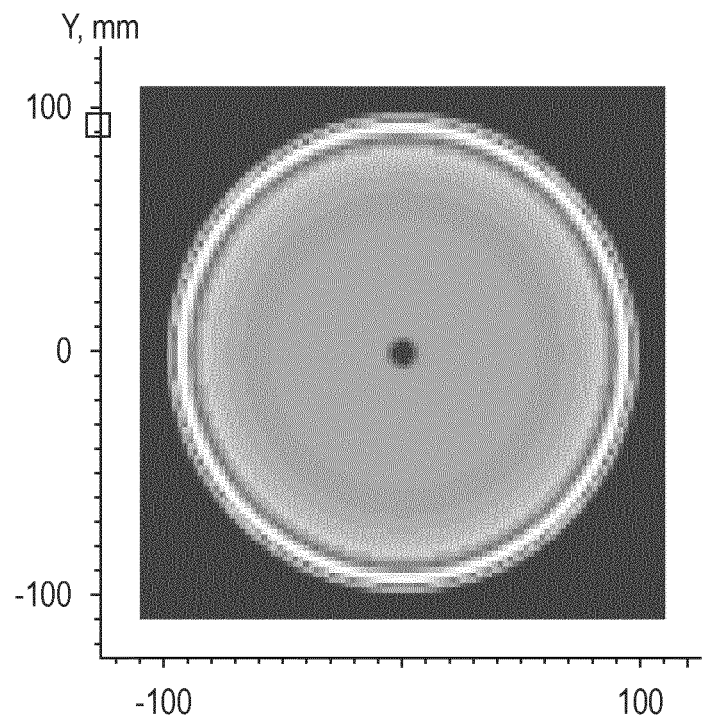
Figure 5D:
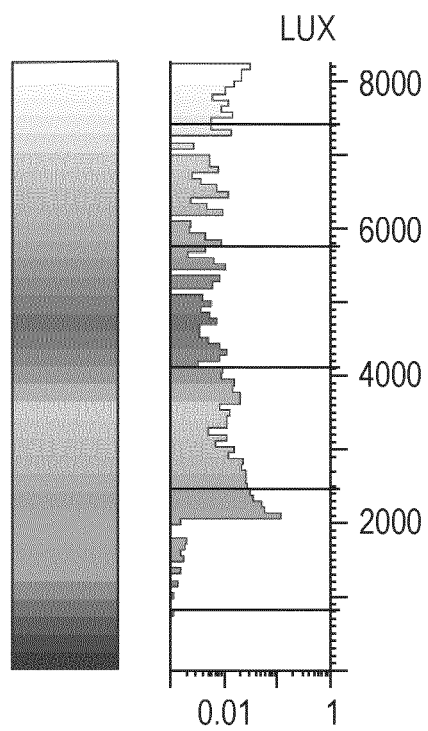

FIG. 5(d) also shows that there is a much broader range of light intensities and therefore a less uniform overall light intensity.

FIG. 6 shows the shape of the internal and external surfaces of an example of bubble lens more clearly with an optically inactive outer surface, and shows the ray paths through the lens, the intensity distribution at the output, and the intensity distribution when projected on a surface. It also shows that the outer shape is converted from a hemispherical shape to a slightly conical shape in order to provide a desired optically inactive surface, To create the optically inactive outer surface, the surface is perpendicular to the ray travel direction at each location (assuming the LED to be a point source, so that there is only one ray direction through each location of the outer surface).

To define the shape of the outer surface, the shape is chosen so that a ray crosses this surface without deflection. For this, it is calculated under which angle the ray is incident at the outer surface and the orientation of the surface at that location is calculated accordingly.

At the light extracting surface side, if the extracting surface 42 is sufficiently far from the collecting surface 40 the rays can be approximated as coming from a single point, as opposed to the inner surface.

By bringing the outer extracting surface 42 closer, it becomes necessary to correct for this approximation. This gives rise to the conic shaped outer surface 42 of FIG. 6. The inner collecting surface 40 can thus still be approximated by a point source approximation.

The conic surface allows the material volume to be reduced up to a certain limit when at some point the lens thickness has reached its minimal value of say 1 mm. This minimal lens thickness can be seen in FIG. 6 to be located at the optical axis.

Figure 6A:
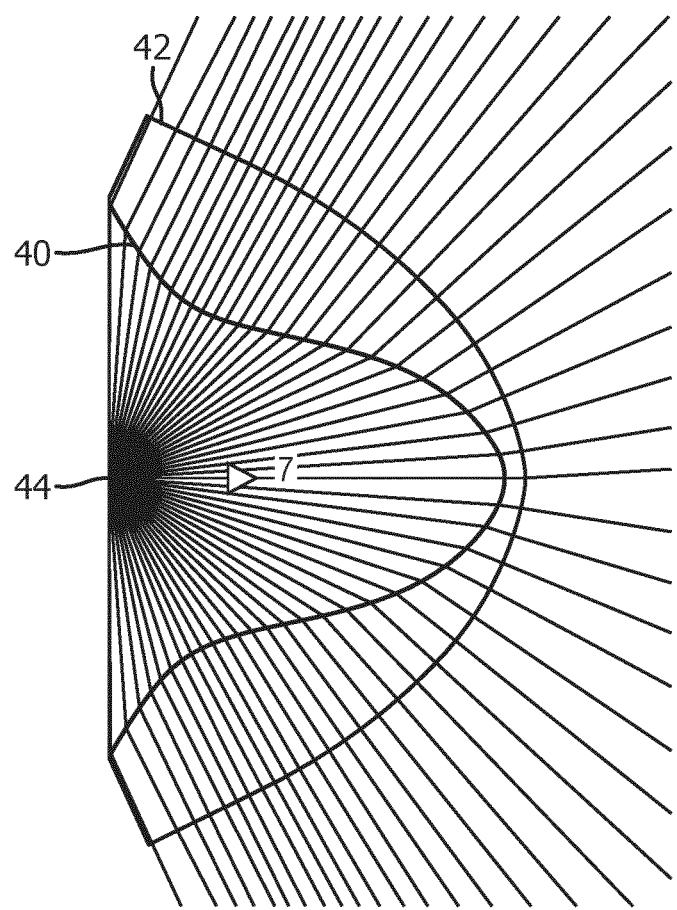
FIG. 6 shows the shape of the internal and external surfaces of a first example of bubble lens with an optically inactive surface, and shows the ray paths through the lens, the intensity distribution at the output, and the intensity distribution when projected on a surface.
Figure 6B:
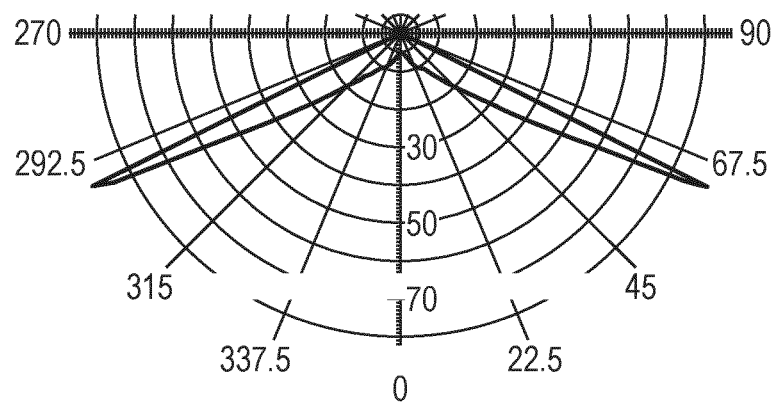
Figure 6C:
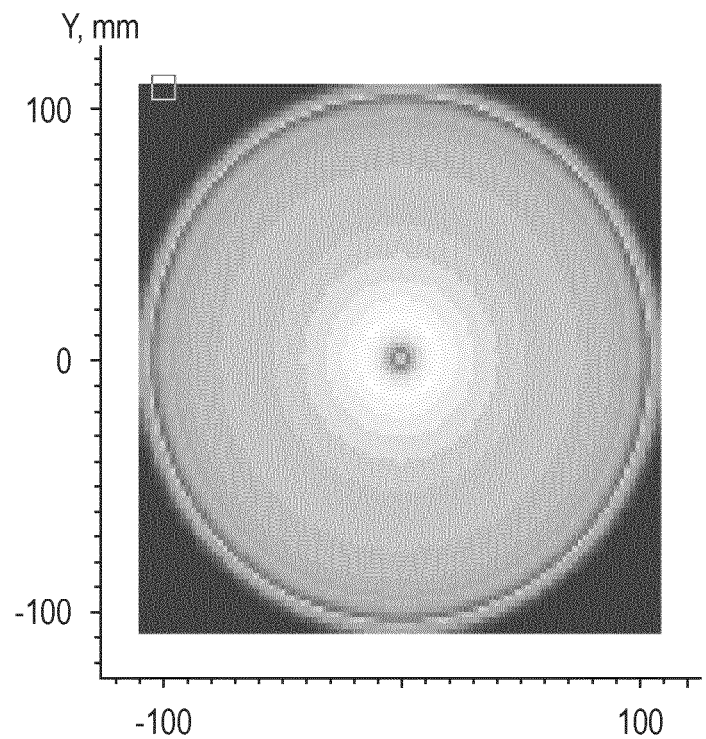
Figure 6D:
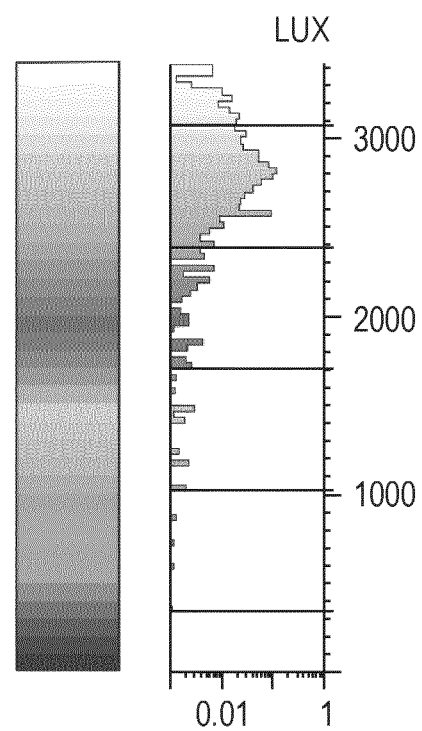

FIG. 6(d) shows that this design enables a more uniform light distribution, with essentially one peak at around 2800 Lux.

The invention enables a further reduction in the lens volume, for example with the lens volume reduced by applying the same minimal thickness across the whole lens area. In order to enable the size to be reduced further while maintaining no optical effect at the second surface 42, the outer surface is adapted so that it is no longer a smooth surface. Instead it is formed with a stepped profile with a series of facets.

A first example is shown in FIG. 7.

The steps of the stepped profile each comprise a riser portion and an output portion, wherein the riser portions are parallel with a ray direction originating from a point output of the LED (i.e. from a point source which is assumed to represent the output of the LED) and the output portions are normal to that ray direction. Thus, the light does not impinge on the riser portions because they are parallel to the light direction, and the output portions do not bend the light due to the perpendicular relationship.

The inner surface 40 is fully determined by the incident luminous intensity and the target luminous intensity. Generally, the incident intensity is Lambertian and has a cosine dependence. For a batwing distribution the inner surface 40 is shaped such that rays emitted at 0° will refract away from the optical axis, while rays near 90° refract towards the optical axis. As a result there is always a surface location where the optical activity (dioptric power) is approximately zero. Such ray description determines the inner surface shape.

The stepped profile applied to the outer surface 42 is to minimize the total lens volume. This can be implemented by shifting each facet element parallel to the exit ray as close as possible towards the inner surface. As the outer surface has no optical activity, the draft facets (the upright parts of each step) remain parallel to the rays and cannot collect any flux, which renders it an efficient design.

As long as the outer surface 42 is perpendicular to the traveling rays it is possible to reduce the distance between inner and outer surface as the draft facets of each step are oriented perfectly parallel to the rays.

FIG. 7 shows the shape of the internal and external surfaces when the stepped surface is applied to a bubble lens, and again shows the ray paths through the lens, the intensity distribution at the output, and the intensity distribution when projected on a surface.

In this design, at each position around the lens, the general distance between the inner and outer surface is reduced to a minimal distance to reduce the amount of material needed. The thickness may again be 1 mm or less, for example less than 0.8 mm or less than 0.6 mm. This design may be considered to be a bell shaped lens.

Figure 7A:
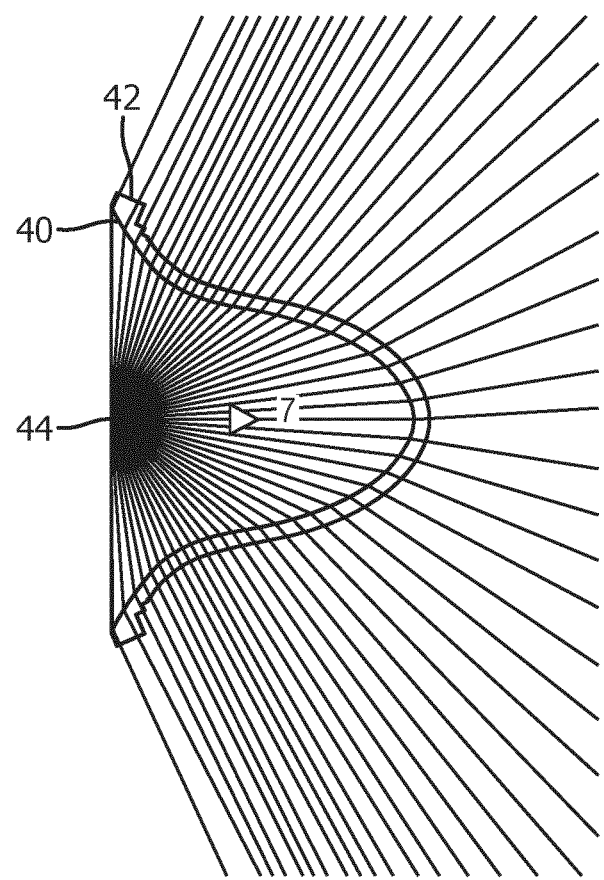
FIG. 7 shows the shape of the internal and external surfaces of a second example of bubble lens with an optically inactive surface, and shows the ray paths through the lens, the intensity distribution at the output, and the intensity distribution when projected on a surface.
Figure 7B:
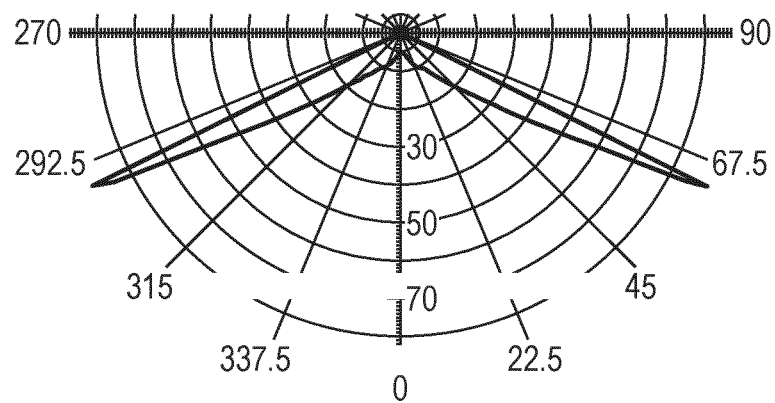
Figure 7C:
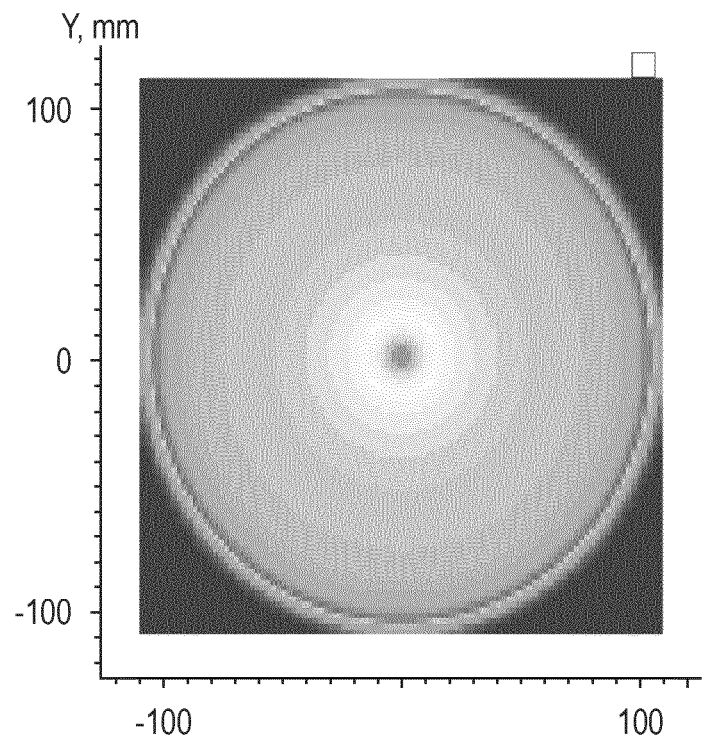
Figure 7D:
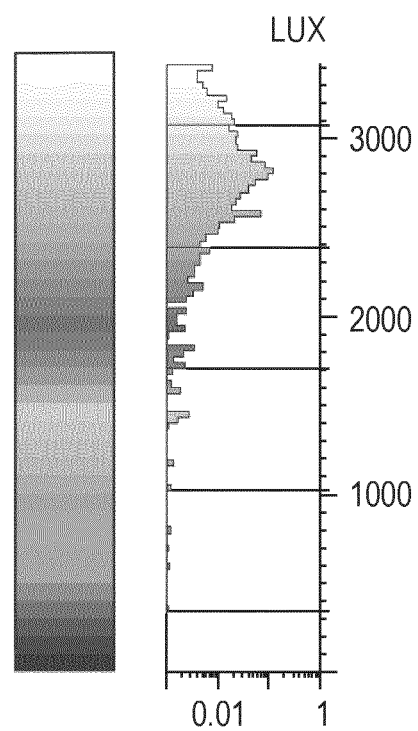

FIG. 7(d) shows that the single intensity peak is preserved so that a relatively uniform output illumination is maintained.

As mentioned above, the design of FIG. 7 makes use of a stepped lens surface. This is shown in exaggerated form in FIG. 8 for the lens design of FIG. 7.

Figure 8:
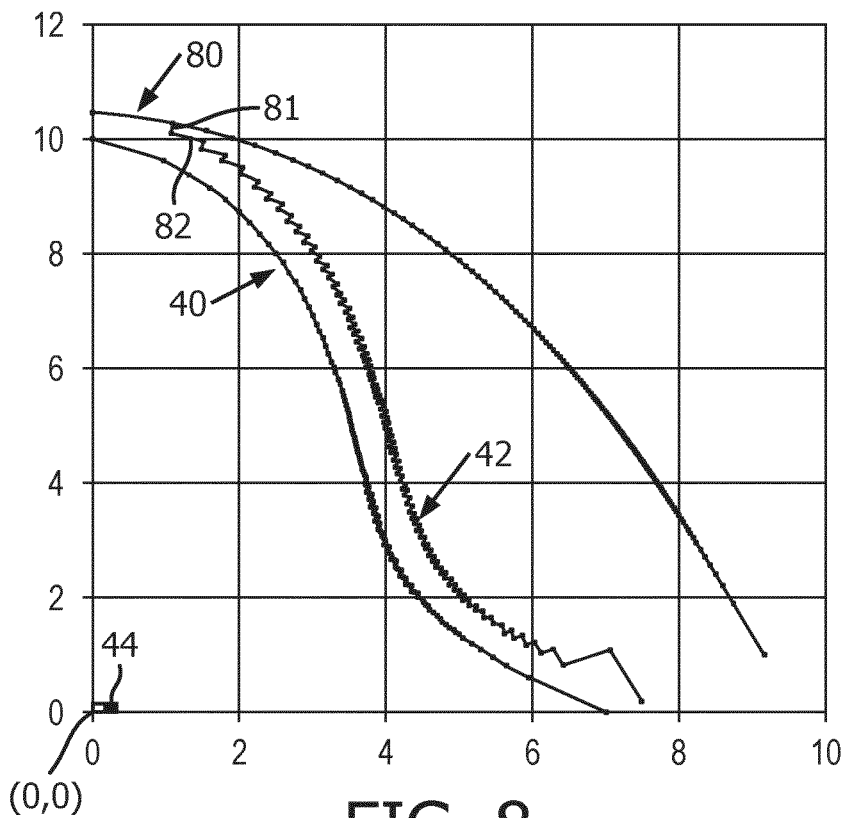
FIG. 8 shows the shapes of the stepped portion in more detail for a bubble lens.

FIG. 8 shows the set of facets 80 more clearly and shows the riser portions 81 and the output portions 82. The riser portions 81 are parallel with the incident ray direction from the center (0,0) of the light emitting area of the LED and the output portions are perpendicular to that ray direction.

The discretization of the stepped surface is based on the collected lumen.

If the facets are sufficiently short, they may be straight, i.e. planar, without significantly affecting the optical performance. They may instead be curved if a coarser grid is chosen, with the local curvature defined by the non-stepped conic surface shape in FIG. 6. Any desired level of discretization may be chosen.

By way of example, there may be between 10 and 500 steps, for example between 20 and 400 steps, for example between 20 and 200 steps. The steps follow a contour around the lens. The steps are for example annular circles (for a rotationally symmetric design) or ellipses or more complicated shapes (for example around a peanut lens shape). There may generally be more than 10 steps, more preferably more than 20 steps and even more preferably more than 50 steps.

The surface fidelity of a smooth surface is for conventional manufacturing technologies higher than that of a stepped surface. Hence the stepped surface design has a different optimum in the trade-off between material cost and cycle time versus surface quality. Different levels of discretization will give a different trade-off between volume and ease/accuracy of manufacture of the lens shape.

At the limit, the design enables the amount of material to be minimized, given a minimum required thickness. For example the maximum thickness between the inner and outer surfaces over the whole area of the inner and outer surfaces may be less than three times or even less than two times the minimum thickness. Thus, a relatively constant thickness is provided. The thickness variations may arise only from the stepped features rather than from the general overall shape. Thus, by averaging out the steps, so that they become regions of constant thickness, the thickness of the whole design becomes constant. Thus, each step gives rise to the same average thickness, or the average thickness of each step deviates by less than 25% from the average thickness of the whole lens, or even deviate by less than 10% from the average thickness.

Figure 9:
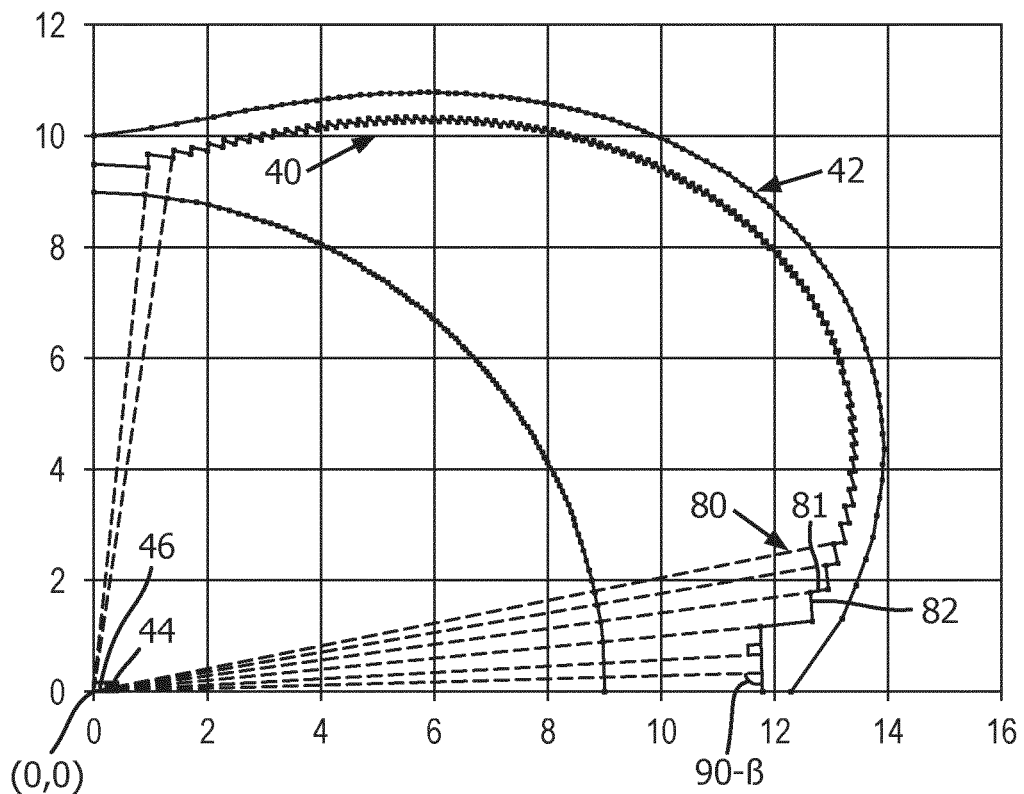
FIG. 9 shows the shapes of the stepped portion in more detail for a peanut lens.

The same approach as shown in FIGS. 7 and 8 may be applied to a peanut lens as shown in FIG. 9.

Like FIG. 8, FIG. 9 shows the set of facets 80 and shows the riser portions 81 and the output portions 82. The riser portions 81 are parallel with the incident ray direction from the center (0,0) of the light emitting area of the LED and the output portions are perpendicular to that ray direction. The facetted surface is the inner surface 40, and it is brought out towards the outer surface 42 to achieve the thickness uniformity in the same way as explained above. Due to the size of the light output area 46 and the size of the output portion there is a slight variation in the incident angle ß of the light rays on the output portion, typically B is in the range of −2.5° to +2.5°, however this causes an insignificant redirection of light rays incident at the surface of said output portion.

The examples above show that the desired batwing output intensity distribution is maintained.

Note that the designs above are all assumed to be rotationally symmetric about the normal (optical axis) direction. Thus, the lens has a circular base around the LED. However, a circular design is not essential. For example, the same approach may be adopted for extrusion symmetric designs, i.e. line sources.

The lens for example has dimensions which are chosen in dependence on the diameter D of the light source. By way of example:

the distance between the light source and the collecting surface at the optical axis is typically in the range 1 to 20 times D;

the lens height is typically in the range 1 to 20 times D plus the minimal lens thickness;

the lens width is typically in the range 0.5 to 3 times the lens height (1 to 20 times D), which yields 0.5-60 times D.

These dimensions take account of the fact that the LED is not an ideal point source. For example, the light output area of the LED may be 1 mm×1 mm (i.e. D=1 mm). By maintaining a distance to the collecting surface (the surface 40) of between 1 mm and 20 mm, the optical output function is maintained despite the non-point size of the LED. The larger end of the range will give rise to better optical performance, whereas the lower end of the range will give better opportunities for miniaturization and reduction of material.

By way of example, the further the riser portions are away from the LED source, the closer the angular range of light will be to the desired parallel direction. Similarly, the further the light output portions are away from the LED source, the closer the angular range of light will be to the desired perpendicular direction.

This is just one example of LED size. For example, D may typically lie in the range 0.2 mm to 5 mm.

The invention is of interest for example for outdoor luminaires in applications where appearance is important and/or where a uniform surface illumination is desired. The luminaires may for example be for the tops of lamp posts, or they may be pendant luminaires, for urban areas. The luminaires may instead be used for bollard lighting.

The invention can however be used for indoor or outdoor areas.

The luminaire may be oriented horizontally to emit light downwardly, but this is not essential. The luminaire may be for illuminating a surface in any orientation.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting module comprising:
   an LED having a light output area; and
   a refractive lens over the LED for providing beam shaping of the light output of the LED, wherein the lens comprises an inner surface and an outer surface, wherein the outer surface is a smooth beam shaping surface which provides a beam shaping function essentially only via refraction, and the inner surface has a stepped profile, wherein the inner surface is nearer to the LED than the outer surface,
   wherein the steps of the stepped profile each comprise a riser portion and an output portion, wherein the riser portions are parallel with a ray direction originating from a central point of the light output area of the LED and the output portions are normal to said ray direction.

2. A module as claimed in claim 1, wherein the LED generates an output with a Lambertian intensity distribution.

3. A module as claimed in claim 1, wherein output intensity of the module has a batwing distribution.

4. A module as claimed in claim 3, wherein the beam shaping surface is shaped such that rays emitted along the optical axis are refracted away from the optical axis, and rays approaching 90° to the optical axis are refracted towards the optical axis.

5. A module as claimed in claim 1, wherein the lens comprises a peanut lens.

6. A module as claimed in claim 1, wherein the minimum thickness between the inner and outer surfaces is less than 1 mm.

7. A module as claimed in claim 6, wherein the minimum thickness is less than 0.8 mm and more preferably less than 0.6 mm.

8. A module as claimed in claim 1, wherein the maximum thickness between the inner and outer surfaces over the whole area of the inner and outer surfaces is less than three times the minimum thickness.

9. A module as claimed in claim 8, wherein the maximum thickness between the inner and outer surfaces over the whole area of the inner and outer surfaces is less than double the minimum thickness.

10. A module as claimed in claim 1, wherein the distance between the LED and the inner surface is in the range 1 to 20 times the lateral extent of a light output surface of the LED.

11. A module as claimed in claim 1, wherein the width of the outer surface of the lens at its base is in the range 0.5 to 3 times the lens height.

12. A module as claimed in claim 1, wherein the lens is formed of PC, PMMA, PET, PEN or COC.

* * * * *